(12) United States Patent
Oda et al.

(10) Patent No.: US 11,927,471 B2
(45) Date of Patent: Mar. 12, 2024

(54) COMBINATION WEIGHING APPARATUS WITH WATER RESISTANCE

(71) Applicant: Ishida Co., Ltd., Kyoto (JP)

(72) Inventors: Kazuteru Oda, Ritto (JP); Toshiharu Kageyama, Ritto (JP); Naomi Imaaki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 256 days.

(21) Appl. No.: 17/517,350

(22) Filed: Nov. 2, 2021

(65) Prior Publication Data

US 2022/0146302 A1    May 12, 2022

(30) Foreign Application Priority Data

Nov. 6, 2020   (JP) ................................. 2020-185844

(51) Int. Cl.
*G01G 19/387* (2006.01)
*B65G 47/14* (2006.01)
*G01G 21/22* (2006.01)

(52) U.S. Cl.
CPC ....... *G01G 19/387* (2013.01); *B65G 47/1407* (2013.01); *G01G 21/22* (2013.01)

(58) Field of Classification Search
CPC .... G01G 13/18; G01G 19/387; G01G 19/393; G01G 21/22; B65G 47/1407; H05K 5/0095; H05K 5/02; H05K 5/0214; H05K 5/06; H05K 5/069; F16M 1/00; B65B 2210/06; B65D 88/32
See application file for complete search history.

(56) References Cited

U.S. PATENT DOCUMENTS

| | | | |
|---|---|---|---|
| 4,844,190 A | 7/1989 | Mikami et al. | |
| 5,038,875 A * | 8/1991 | Kitagawa | G01G 21/28 177/180 |
| 6,188,029 B1 * | 2/2001 | Miyamoto | G01G 19/393 251/303 |
| 9,234,787 B2 * | 1/2016 | Nagai | G01G 19/393 |
| 2013/0284521 A1 | 10/2013 | Nagai | |

FOREIGN PATENT DOCUMENTS

JP    5406381 B2    2/2014

OTHER PUBLICATIONS

The extended European search report issued by the European Patent Office dated Mar. 9, 2022, which corresponds to European Patent Application No. 21205699.8-1001 and is related to U.S. Appl. No. 17/517,350.

* cited by examiner

*Primary Examiner* — Randy W Gibson
(74) *Attorney, Agent, or Firm* — Studebaker & Brackett PC (57) ABSTRACT

In a combination weighing apparatus (1), a driver (10) is attached to a main body (100) by being inserted into an opening (100A) provided in a lateral surface of the main body, in a direction from an outer side (O) toward an inner side (I) of the main body, a first motor (14), a second motor (13), and a load cell (12) are arranged on the inner side of the main body in relation to a base (11), and in a state where the driver is attached to the main body, at least a portion of the first motor, the second motor, and the load cell is located further on a lower side (L) than a lower edge (E1) of the opening.

11 Claims, 8 Drawing Sheets

COMBINATION WEIGHING APPARATUS WITH WATER RESISTANCE

CROSS-REFERENCE TO RELATED APPLICATION

This application is based upon and claims the benefit of priority from Japanese Patent Application No. 2020-185844 filed on Nov. 6, 2020 in Japan, the entire contents of which are incorporated herein by reference.

TECHNICAL FIELD

The present invention relates to a combination weighing apparatus.

BACKGROUND ART

Conventionally, a combination weighing apparatus that is provided with a driver which drives a plurality of hoppers, and a main body to which the driver is attached, is known.

In such a combination weighing apparatus, when the driver is attached to the lateral surface of the main body, the height-direction dimension of components of the driver which are arranged further on an inner side than an opening provided in the lateral surface of the main body is smaller than the height-direction dimension of the opening. The driver can therefore be mounted straight in a vertical direction relative to the lateral surface of the main body (see JP 5406381 B2, for example).

SUMMARY OF THE INVENTION

Technical Problem

In recent years, the importance of hygiene in goods factories has been increasing, and it has become necessary to improve the water resistance of a combination weighing apparatus for the purpose of sprinkler cleaning.

However, the current configuration of the driver in the foregoing combination weighing apparatus has been problematic in that it is difficult to reduce the height-direction dimension and in that improving the water resistance is difficult.

Furthermore, in the foregoing combination weighing apparatus, a motor for driving a pool hopper is disposed directly below a load cell. However, there has been the problem that the load cell is affected by the heat generated by the motor, thus degrading the weighing accuracy.

Therefore, the present invention was conceived in view of the foregoing problem, and an object thereof is to provide a combination weighing apparatus that makes it possible to improve water resistance and to prevent the weighing accuracy from being degraded.

Solution to Problem

A combination weighing apparatus according to one embodiment is summarized as including: a first hopper that, after temporarily storing a good inserted from outside, discharges the good downstream; a second hopper that, after temporarily storing the good discharged from the first hopper, discharges the good downstream; a driver that drives the first hopper and the second hopper; and a main body to which the driver is attached, wherein the driver is attached to the main body by being inserted into an opening provided in the lateral surface of the main body, in a direction from an outer side toward an inner side of the main body, the driver has: a base that blocks the opening and separates the inner side from the outer side of the main body in a state of being attached to the main body; a first motor that drives the first hopper; a second motor that drives the second hopper; and a load cell that detects a weight of the good stored in the second hopper, the first motor, the second motor, and the load cell are arranged on the inner side of the main body in relation to the base, and in a state where the driver is attached to the main body, at least a portion of the first motor, the second motor, and the load cell is located further on a lower side than the lower edge of the opening.

Advantageous Effects of Invention

According to the present invention, it is possible to provide a combination weighing apparatus that makes it possible to improve water resistance and to prevent the weighing accuracy from being degraded.

DESCRIPTION OF EMBODIMENTS

Hereinafter, the present embodiment will be described in detail with reference to the attached drawings. In the following description of the drawings, the same or similar parts are denoted by the same or similar reference symbols. However, note that the drawings are schematic, and ratios of dimensions are different from actual ones. Therefore, specific dimensions and the like are determined in consideration of the following description. Moreover, there may be portions where dimensional relationships or proportions are different among the drawings. In this specification and the drawings, elements having substantially the same function and configuration are denoted by the same reference numerals to omit redundant description, and elements not directly related to the present invention are omitted.

First Embodiment

A combination weighing apparatus 1 according to a first embodiment of the present invention will be described hereinbelow with reference to FIGS. 1 to 8.

Figure 1:
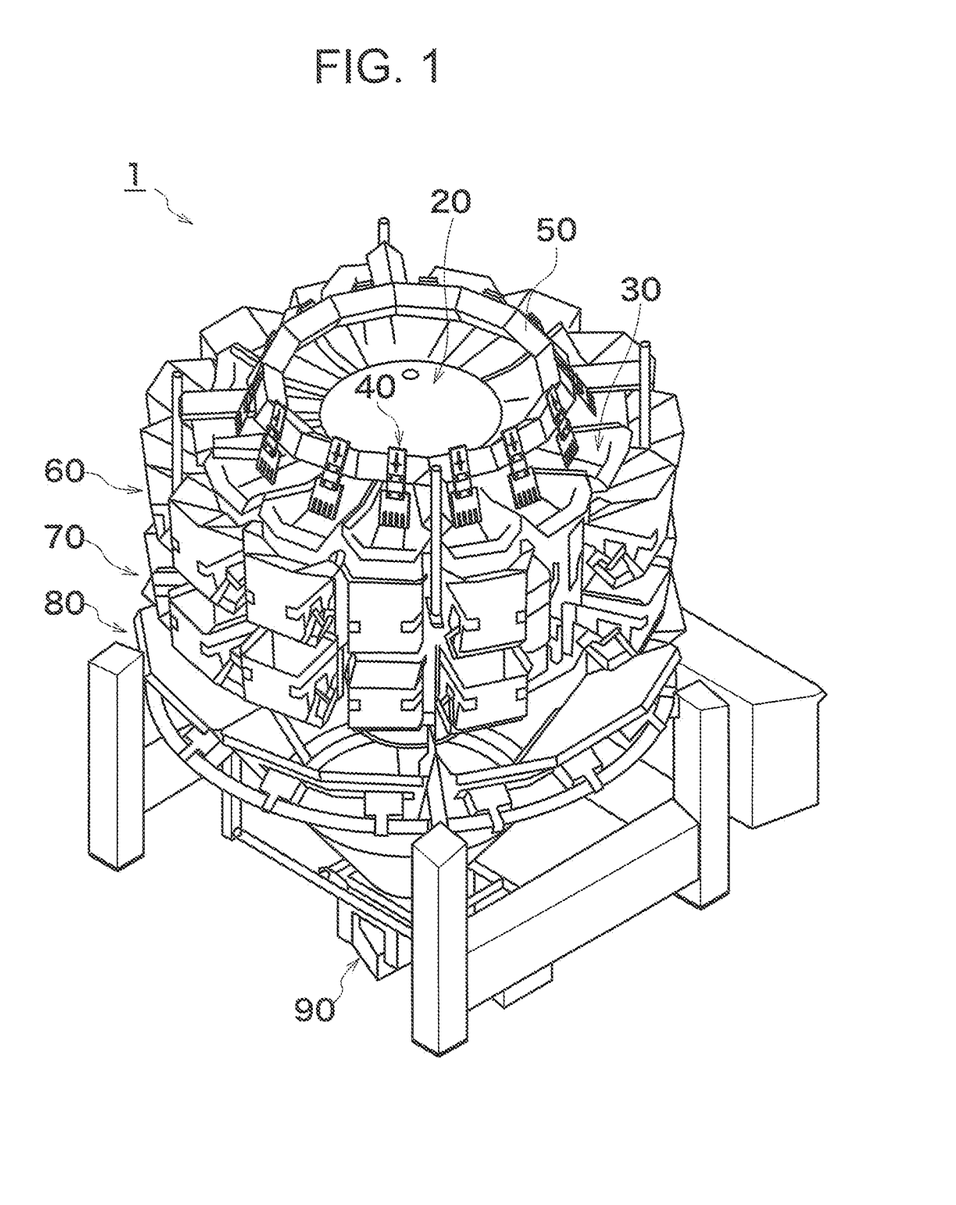
FIG. 1 is a perspective view of an example of the whole configuration of a combination weighing apparatus 1 according to a first embodiment.

As illustrated in FIG. 1, the combination weighing apparatus 1 according to this embodiment has a dispersion table 20, a radiation feeder 30, a flow rate regulation portion 40, a support portion 50, a pool hopper 60, a weighing hopper 70, a chute 80, and a timing hopper 90.

The dispersion table 20 may also be configured to disperse a good that has been inserted from the outside while supplying the good to a plurality of radiation feeders 30 arranged around the dispersion table 20.

The plurality of radiation feeders 30 are each configured to convey, to the pool hopper 60 provided for each radiation feeder 30, the good supplied from the dispersion table 20.

Note that, although not illustrated in this embodiment, a booster hopper may also be arranged downstream of the weighing hopper 70 and upstream of the chute 80.

Furthermore, the radiation feeders 30 each have a conveyance path for conveying goods, and the flow rate regulation portion 40 is arranged on the conveyance path. The flow rate regulation portion 40 is configured to regulate the flow rate of the goods conveyed to the pool hopper 60. In addition, the support portion 50 is configured to support the flow rate regulation portion 40.

The pool hopper 60 is configured to deliver the goods supplied from the radiation feeder 30 to the weighing hopper 70, which is arranged below each pool hopper 60.

Each weighing hopper 70 is configured to acquire the weight value of the goods that are received from each pool hopper 60 and temporarily accumulated.

Here, the control unit (not illustrated) is configured to select a combination of the weight values acquired by each weighing hopper which is within a predetermined allowable range and closest to the target value, and to discharge the temporarily accumulated goods from the weighing hopper 70 corresponding to the combination into a chute 80 arranged below the weighing hopper 70.

Here, each pool hopper 60 corresponds to a first hopper that temporarily stores goods to be inserted from outside and then discharges such goods downstream, and each weighing hopper 70 corresponds to a second hopper that temporarily stores the goods discharged from each pool hopper 60 (first hopper) and then discharges such goods downstream.

The chute 80 is configured to supply the goods discharged from each weighing hopper 70 to the timing hopper 90.

The timing hopper 90 is configured to supply the goods supplied by the chute to, for example, a bag-making and packaging machine which is installed in a subsequent stage of the combination weighing apparatus 1.

Figure 2:
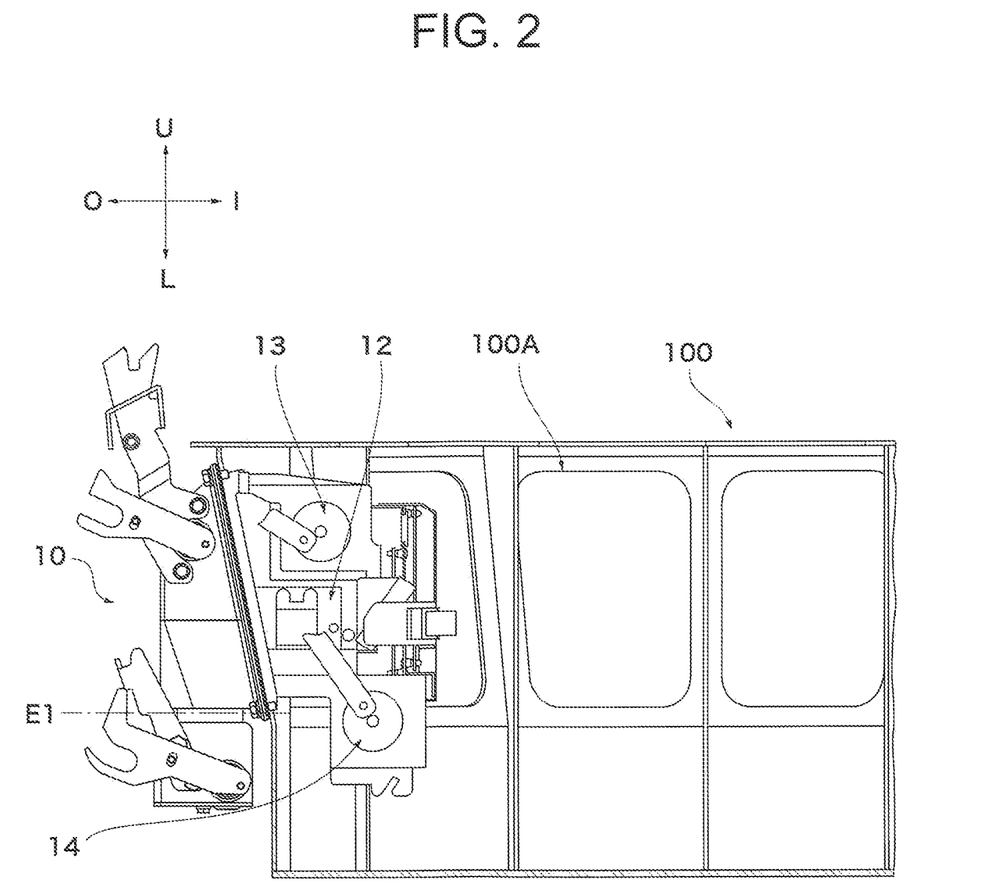
FIG. 2 is a diagram to illustrate an example of a main body 100 and a driver 10 of the combination weighing apparatus 1 according to the first embodiment.

Furthermore, as illustrated in FIG. 2, the combination weighing apparatus 1 according to the present embodiment has a plurality of drivers 10 that drive each pool hopper 60 and each weighing hopper 70, and a main body 100 to which such drivers 10 are attached.

Note that, as illustrated in FIG. 2, each of the drivers 10 is configured to be attached to the main body 100 by being inserted into an opening 100A provided in the lateral surface of the main body 100, in a direction from an outer side O toward an inner side I of the main body 100.

In such a combination weighing apparatus 1, the height-direction dimension of the components (internal components) of the driver 10 that are arranged further on the inner side I than the opening 100A provided in the lateral surface of the main body 100 is larger than the height-direction dimension of this opening 10A. It is thus possible to attach the driver 10 to the lateral surface of the main body 100 by inserting the internal components into the opening 100A of the main body 100 such that the driver 10 is inclined relative to the opening 100A.

Figure 3:
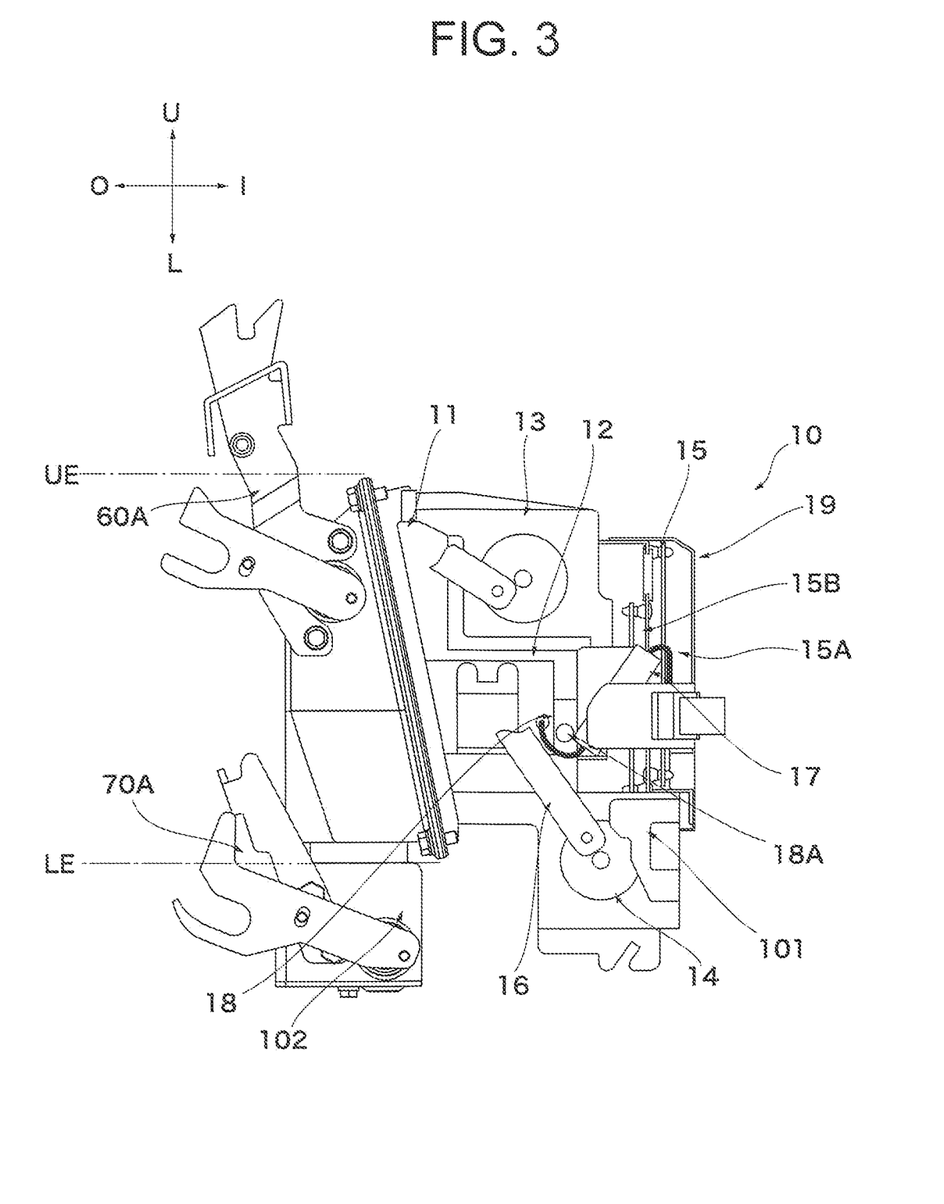
FIG. 3 is a diagram to illustrate an example of the configuration of the driver 10 in a state of attachment to the main body 100 of the combination weighing apparatus 1 according to the first embodiment.

As illustrated in FIG. 3, the driver 100 is provided with a base 11, a load cell 12, a second motor 13, a first motor 14, a first-hopper link member 16, a first hopper hanger 60A, and a second hopper hanger 70A.

The base 11 is configured to block the opening 100A and separate the inner side I from the outer side O of the main body 100 in a state where the driver 10 is attached to the main body 100.

The first hopper hanger 60A is configured such that the pool hopper 60 is attached to the distal end of the first hopper hanger 60A, and the second hopper hanger 70A is configured such that the weighing hopper 70 is attached to the distal end of the second hopper hanger 70A.

The first motor 14 is configured to drive the pool hopper 60 (and the first hopper hanger 60A), and the second motor 13 is configured to drive the weighing hopper 70 (and the second hopper hanger 70A).

The load cell 12 is configured to detect the weight of the goods stored in the weighing hopper 70.

The first-hopper link member 16 is a member that links the first motor 14 to the first hopper hanger 60A.

As illustrated in FIGS. 2 and 3, the first motor 14, the second motor 13, and the load cell 12 are arranged on the inner side of the main body 100 in relation to the base 11.

Furthermore, as illustrated in FIG. 2, at least a portion of the first motor 14, second motor 13, and load cell 12 are located further on a lower side L than a lower edge E1 of the opening 100A in a state where the driver 10 is attached to the main body 100. In the example of FIG. 2, in such a state, the first motor 14 is located further on the lower side L than the lower edge E1 of the opening 100A.

According to such a configuration, the height-direction dimension of the opening 100A can be reduced, thus improving water resistance.

As illustrated in FIGS. 2 and 3, the first motor 14, the second motor 13, and the load cell 12 are arranged in a state of alignment in an up-down direction U/L. In the examples of FIGS. 2 and 3, the second motor 13, the load cell 12, and the first motor 14 are arranged in a state of alignment in that order, starting from the upper side U. In other words, the second motor 13 is arranged further on the upper side U than the load cell 12, and the load cell 12 is arranged further on the upper side U than the first motor 14.

Here, among the first motor 14, the second motor 13, and the load cell 12, at least the member arranged lowermost on the lower side L is arranged offset on the inner side I of the main body 100 relative to other members. In the examples of FIGS. 2 and 3, the first motor 14 is arranged offset to the inner side I of the main body 100 relative to the second motor 13 and load cell 12.

According to this configuration, because the first motor 14 is not arranged directly under the load cell 12, the effect of the heat generated by the first motor 14 on the load cell 12 is reduced, and the weighing accuracy can be improved.

Figure 4:
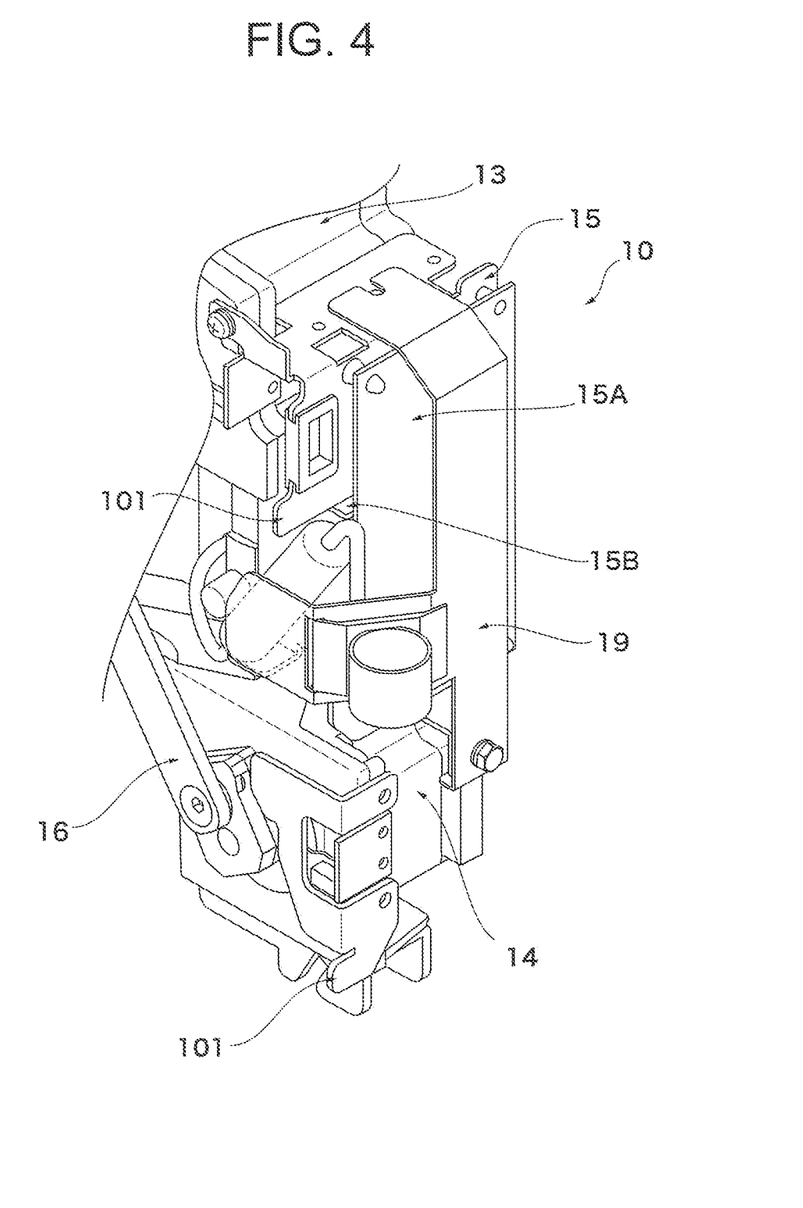
FIG. 4 is a diagram to illustrate an example of arrangement of a bracket 15, a first substrate 15A, and a second substrate 15B of the driver 10 of the combination weighing apparatus 1 according to the first embodiment.

In addition, as illustrated in FIG. 4, the driver 10 may be further provided with a bracket 15, a first substrate 15A, and a second substrate 15B.

The bracket 15 is arranged further on the inner side I of the main body 100 than the second motor 13 and is fixed to the weighing hopper 70, as illustrated in FIG. 3.

For example, the first substrate 15A is the driver substrate of a stepping motor for opening and closing the pool hopper 60 and the weighing hopper 70, and the second substrate 15B has an open-close control and preamble circuit for the pool hopper 60 and the weighing hopper 70.

The substrate 15B is arranged further on the outer side O of the main body 100 than the first substrate 15A, as illustrated in FIGS. 3 and 4.

As illustrated in FIGS. 3 and 4, the first substrate 15A and second substrate 15B are fixed to the bracket 15 in a state where their respective back surfaces are facing each other.

Furthermore, as illustrated in FIG. 3, the first substrate 15A and the second substrate 15B are arranged further on the inner side I of the main body 100 than the second motor 13 and the load cell 12, and are arranged further on the upper side U than the first motor 14. Here, as illustrated in FIG. 4, the second substrate 15B is arranged on the back surface (inner side I) of the second motor 13.

According to such a configuration, by arranging the first substrate 15A and the second substrate 15B as described above, it is possible to fit the internal components of the driver 10 into a minimum space, which has the effect of eliminating the need to increase the size of the main body 100.

Figure 5:
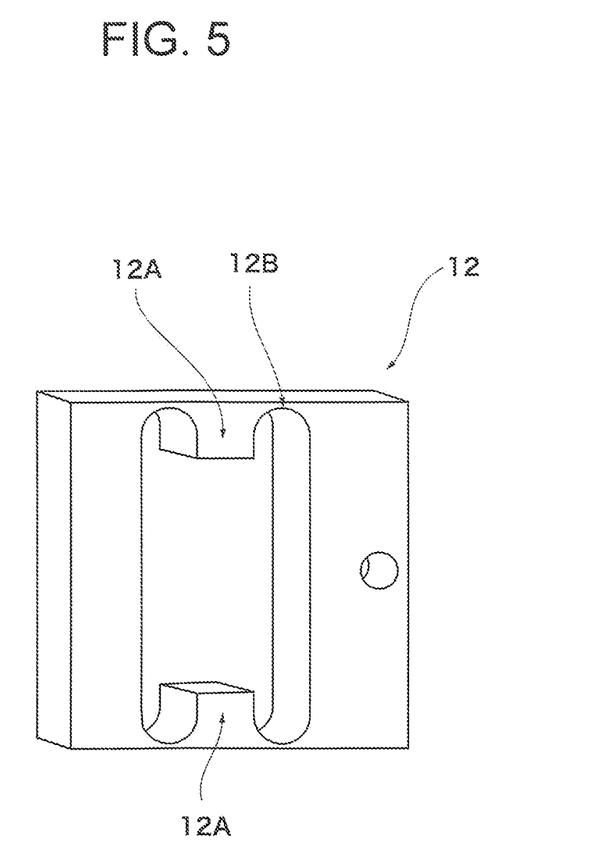
FIG. 5 is a diagram to illustrate an example of a load cell 12 in the driver 10 of the combination weighing apparatus 1 according to the first embodiment.

As illustrated in FIG. 5, the load cell 12 has an upper and lower pair of parallel beams 12A, each provided with a thin-walled portion (notch) 12B at two front and rear locations in the longitudinal direction.

Here, as illustrated in FIG. 3, the thin-walled portion 12B provided on the upper-side U parallel beam 12A and/or the thin-walled portion 12B provided on the lower-side L parallel beam 12A is arranged so as to not overlap a first-hopper link member 18 in a horizontal view.

In the example of FIG. 3, the thin-walled portion 12B provided on the upper-side U parallel beam 12A is arranged so as to not overlap the first-hopper link member 18 in a horizontal view. More specifically, the first-hopper link member 18 has a crank shape as illustrated in FIG. 3.

Here, as illustrated in FIG. 3, the base 11 is inclined with respect to the vertical direction so that the upper end UE is located more on the outer side O of the main body 100 than the lower end LE.

Normally, in order to adjust the off-center characteristic of the combination weighing apparatus 1, four corner adjustment is performed by using a file or the like to shave the area close to the end surface of the thin-walled portion 12B. Therefore, in the case of this combination weighing apparatus 1, access to the thin-walled portion 12B is required.

In this regard, according to the foregoing configuration, the base 11 is inclined, and the first-hopper link member 18 has a crank shape, as illustrated in FIG. 3, and therefore the thin-walled portion 12B provided on the upper-side U parallel beam 12A is exposed without overlapping other members in a horizontal view. As a result, access to the thin-walled portion 12B is easy during the four corner adjustment, which affords the advantageous effects of improving the workability of four corner adjustment and reducing man-hours, leading to reduced costs.

Figure 6:
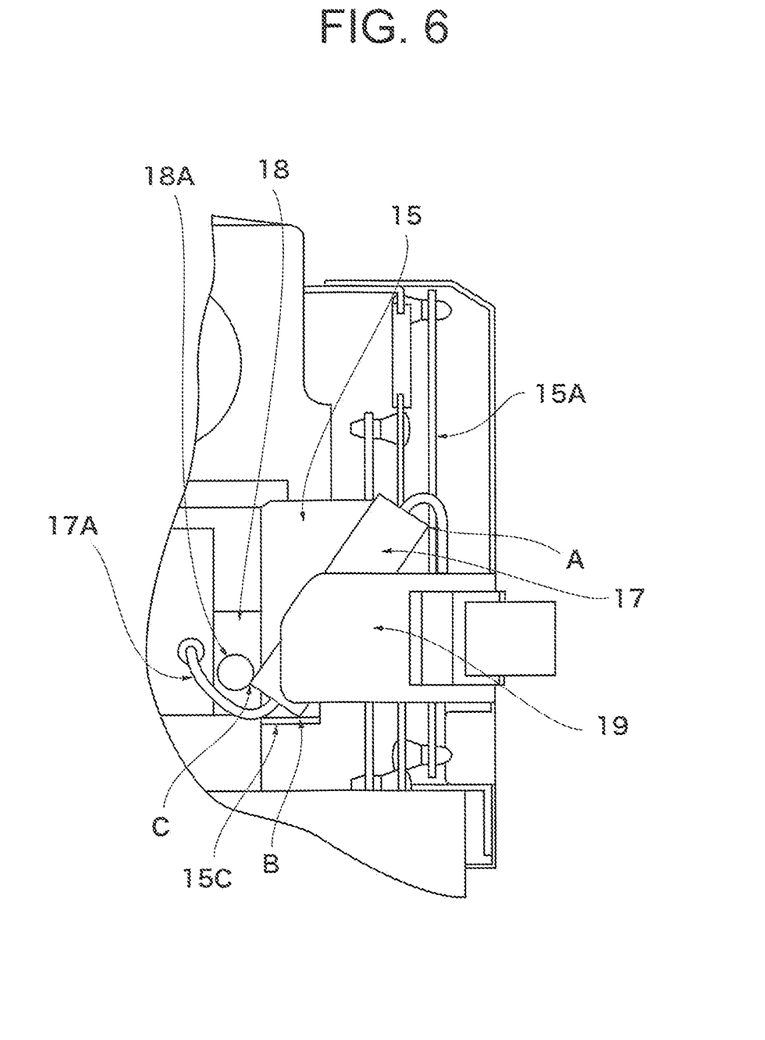
FIG. 6 is a diagram to illustrate an example of a ferrite core 17 in the driver 10 of the combination weighing apparatus 1 according to the first embodiment.

As illustrated in FIGS. 2 and 6, the driver 10 may further include a ferrite core 17 attached to a harness 17A and a load cell bracket 18 fixed to the load cell 12.

Here, the ferrite core 17 is a ferrite core for noise rejection that is attached to the harness 17A between the load cell 12 and the first substrate 15A.

As illustrated in FIG. 6, the ferrite core 17 is supported by using, as points of support, the back surface of the first substrate 15A (position A in FIG. 6), a bottom plate 15C (position B in FIG. 6) provided on the lower edge of the bracket 15, and a protrusion 18A (position C in FIG. 6) on the lateral surface of the load cell bracket 18.

More specifically, as illustrated in FIG. 6, the ferrite core 17 is supported at three points as described above, and is fixed by being held down by the substrate cover 19. In addition, because the length of the harness 17A between the load cell 12 and the first substrate 15A is short, the ferrite core 17 is pulled clockwise with the above-mentioned protrusion 18A and the bottom plate 15C serving as the fulcrum, as illustrated in FIG. 6, and thus the position of the ferrite core 17 is uniquely determined.

According to such a configuration, the position of the ferrite core 17 is then clear, and the operator is thus able to assemble the ferrite core 17 without thinking. In addition, such a configuration makes it possible to eliminate variations in the assembly of the ferrite core 17 because same is not dependent on the assembly method of the operator, thus shortening the man-hours and also reducing costs.

Figure 7:
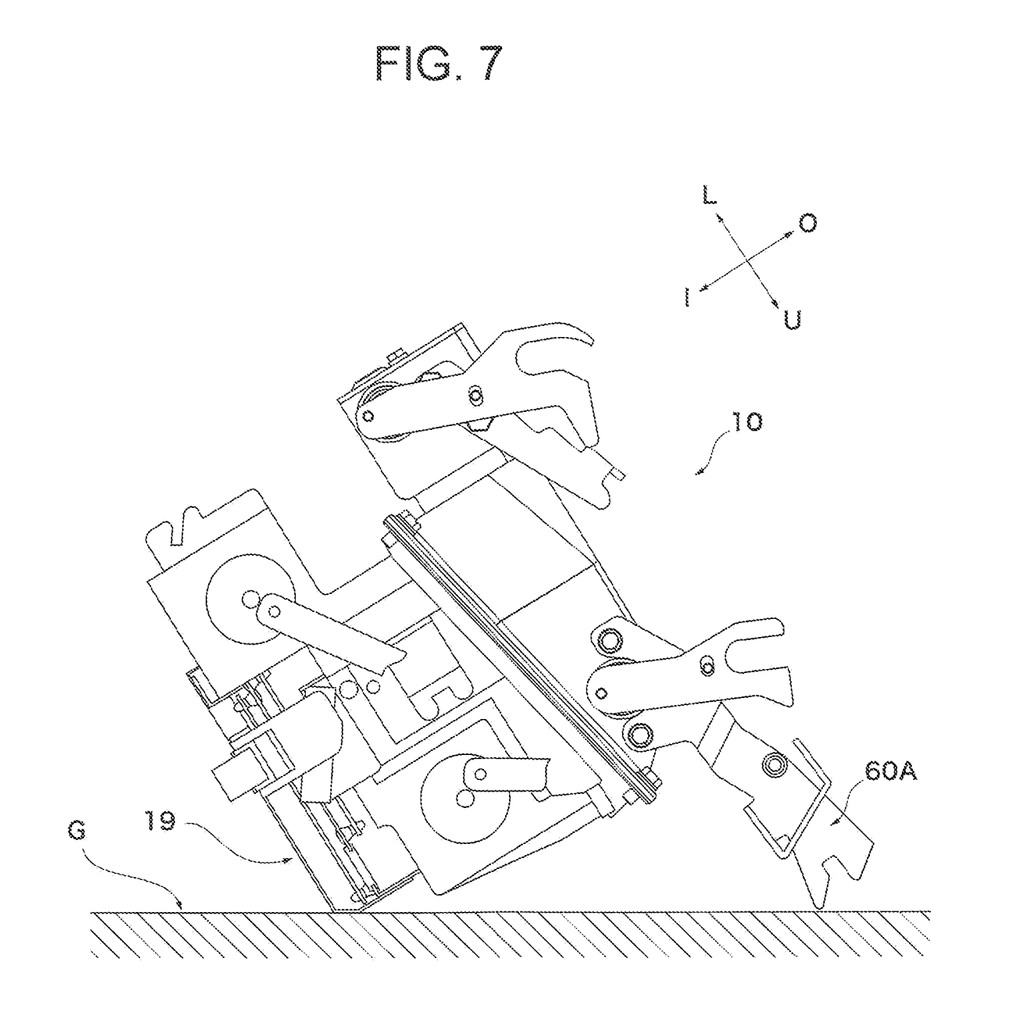
FIG. 7 is a diagram illustrating an example of a vertical orientation of the driver 10 of the combination weighing apparatus 1 according to the first embodiment.

As illustrated in FIGS. 2 and 7, the driver 10 may further include a substrate cover 19 that covers the inner side I of the main body 100 of the first substrate 15A, and a weighing-time sensing unit 102.

The weighing-time sensing unit 102 is connected to the free end side of the load cell 12, and the weighing of goods can be performed by placing the goods on the weighing-time sensing unit 102.

As illustrated in FIG. 3, in the combination weighing apparatus 1 according to this embodiment, the weighing-time sensing unit 102 protrudes more toward the outside than the flange portion of the base 11.

Here, as illustrated in FIG. 7, when the driver 10 is placed such that the up-down direction of the driver 10 (vertical orientation) is inverted, the upper end of the first hopper hanger 60A and the substrate cover 19 are supported by grounding (G).

Figure 8:
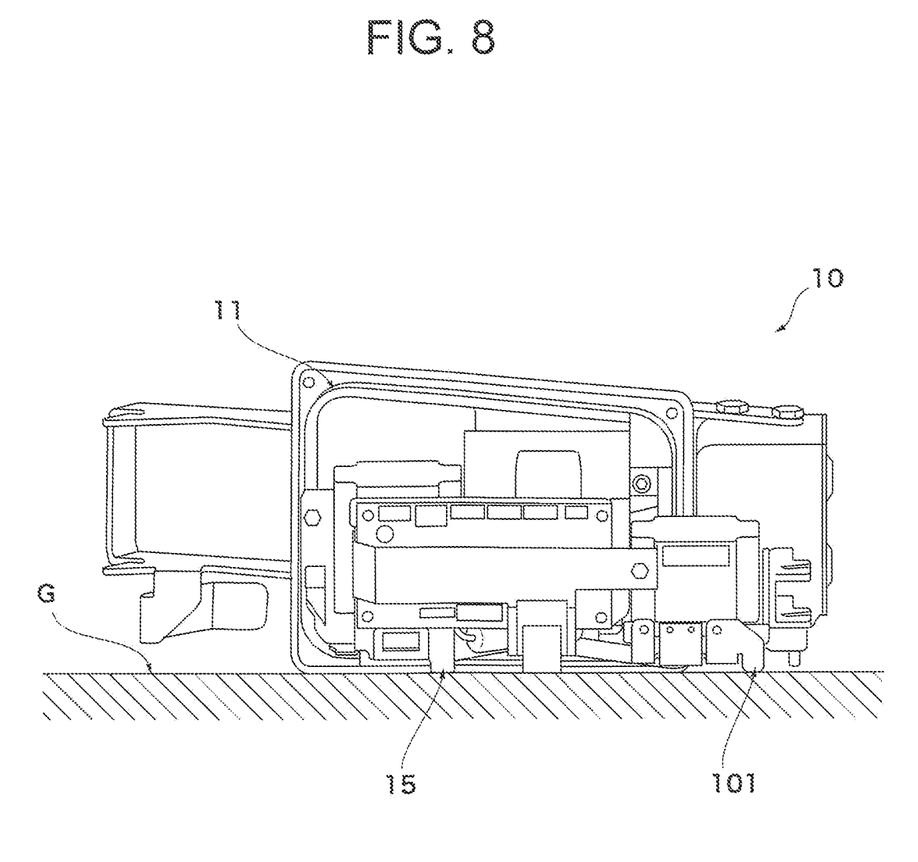
FIG. 8 is a diagram illustrating an example of a horizontal orientation of the driver 10 of the combination weighing apparatus 1 according to the first embodiment.

Furthermore, as illustrated in FIG. 8, the driver 10 may further include a sensor stopper 101 attached to the inner side I of the main body 100 of the first motor 14.

Here, as illustrated in FIG. 8, when the driver 10 is placed such that the end of the driver 10 in the width direction W is on the lower side (horizontal orientation), the end of the base 11 in the width direction W, the end of the substrate cover 19 in the width direction W, and the end of the sensor stopper 101 in the width direction W are supported by grounding (G).

According to this configuration, the driver 10 itself can be afforded a vertical or horizontal orientation without placing a burden on the weighing-time sensing unit 102 even when the weighing-time sensing unit 102 protrudes more toward the outside than the flange portion of the base 11 and the flange portion of the base 11 is inclined relative to the vertical direction.

The combination weighing apparatus 1 according to the present embodiment can improve water resistance and prevent the weighing accuracy from being degraded.

Although the present invention is explained in detail using the above-mentioned embodiments, it will be apparent to those skilled in the art that the present invention is not limited to the embodiments described herein. The present invention can be implemented as modifications and changes without departing from the spirit and scope of the present invention defined by the description of the claims. Accordingly, the description of the present specification is for the purpose of illustration and is not intended to limit the present invention in any way.

What is claimed is:

1. A combination weighing apparatus, comprising:
a first hopper that, after temporarily storing a good inserted from outside, discharges the good downstream;
a second hopper that, after temporarily storing the good discharged from the first hopper, discharges the good downstream;
a driver that drives the first hopper and the second hopper; and
a main body to which the driver is attached, wherein
the driver is attached to the main body by being inserted into an opening provided in the lateral surface of the main body, in a direction from an outer side toward an inner side of the main body,
the driver has:
a base that blocks the opening and separates the inner side from the outer side of the main body in a state of being attached to the main body;
a first motor that drives the first hopper;
a second motor that drives the second hopper; and
a load cell that detects a weight of the good stored in the second hopper,
the first motor, the second motor, and the load cell are arranged on the inner side of the main body in relation to the base, and
in a state where the driver is attached to the main body, at least a portion of the first motor, the second motor, and the load cell is located further on a lower side than the lower edge of the opening.

2. The combination weighing apparatus according to claim 1, wherein
the first motor, the second motor, and the load cell are arranged in a state of alignment in an up-down direction, and
among the first motor, the second motor, and the load cell, one member is arranged on the lowermost side so as to be offset on the inner side of the main body relative to other members.

3. The combination weighing apparatus according to claim 2, wherein
the second motor is arranged more on an upper side than the first motor,
the driver further includes:
a bracket that is arranged more on the inner side of the main body than the second motor and that is fixed to the second motor;
a first substrate; and
a second substrate that is arranged more on the outer side of the main body than the first substrate,
the first substrate and the second substrate are fixed to the bracket in a state where the respective back surfaces thereof face each other, and
the first substrate and the second substrate are arranged more on the inner side of the main body than the second motor and the load cell, and are arranged more on the upper side than the first motor.

4. The combination weighing apparatus according to claim 3, wherein
the second motor, the load cell, and the first motor are arranged in a state of alignment in that order, starting from the upper side,
the driver further includes:
a first hopper hanger to a distal end of which the first hopper is attached; and
a first-hopper link member that links the first motor to the first hopper hanger, the load cell has an upper and lower pair of parallel beams that are each provided with a thin-walled portion at two front and rear locations in a longitudinal direction,
the base is inclined relative to a vertical direction such that an upper end thereof is located further on the outer side of the main body than a lower end, and
the thin-walled portion provided to the upper-side parallel beam and/or the thin-walled portion provided to the lower-side parallel beam is arranged so as to not overlap the first-hopper link member in a horizontal view.

5. The combination weighing apparatus according to claim 3, wherein
the driver further includes:
a ferrite core that is attached to a harness; and
a load cell bracket that is attached to the load cell, and
the ferrite core is supported by taking, as points of support, the back surface of the first substrate, a bottom surface provided on the lower edge of the bracket, and a protrusion on the lateral surface of the load cell bracket.

6. The combination weighing apparatus according to claim 4, wherein
the driver further includes:
a ferrite core that is attached to a harness; and
a load cell bracket that is attached to the load cell, and
the ferrite core is supported by taking, as points of support, the back surface of the first substrate, a bottom surface provided on the lower edge of the bracket, and a protrusion on the lateral surface of the load cell bracket.

7. The combination weighing apparatus according to claim 4, wherein
the driver further includes a substrate cover that covers the inner side of the main body of the first substrate, and
when the driver is placed such that the up-down direction of the driver is inverted, the upper end of the first hopper hanger and the substrate cover are supported by grounding.

8. The combination weighing apparatus according to claim 3, wherein
the driver further includes a sensor stopper attached to the inner side of the main body of the first motor, and
when the driver is placed such that an end of the driver in a width direction is on the lower side, an end of the base in the width direction, an end of the bracket in the width direction, and an end of the sensor stopper in the width direction are supported by grounding.

9. The combination weighing apparatus according to claim 4, wherein
the driver further includes a sensor stopper attached to the inner side of the main body of the first motor, and
when the driver is placed such that an end of the driver in a width direction is on the lower side, an end of the base in the width direction, an end of the bracket in the width direction, and an end of the sensor stopper in the width direction are supported by grounding.

10. A combination weighing apparatus, comprising:
a first hopper that, after temporarily storing a good inserted from outside, discharges the good downstream;
a second hopper that, after temporarily storing the good discharged from the first hopper, discharges the good downstream;

a driver that drives the first hopper and the second hopper; and a main body to which the driver is attached, wherein the driver is attached to the main body by being inserted into an opening provided in the lateral surface of the main body, in a direction from an outer side toward an inner side of the main body, the driver has:
- a base that blocks the opening and separates the inner side from the outer side of the main body in a state of being attached to the main body;
- a first motor that drives the first hopper;
- a second motor that drives the second hopper; and
- a load cell that detects a weight of the good stored in the second hopper, the first motor, the second motor, and the load cell are arranged on the inner side of the main body in relation to the base, the second motor, the load cell, and the first motor are arranged in a state of alignment in this order in an up-down direction, and in a state where the driver is attached to the main body, at least a portion of the first motor, the second motor, and the load cell is located further on a lower side than the lower edge of the opening.

11. The combination weighing apparatus according to claim 1, wherein the load cell is disposed between the first motor and the second motor.

\* \* \* \* \*